(12) United States Patent
Natsui et al.

(10) Patent No.: US 10,818,911 B2
(45) Date of Patent: Oct. 27, 2020

(54) POSITIVE-ELECTRODE ACTIVE MATERIAL AND BATTERY

(71) Applicant: Panasonic Intellectual Property Management Co., Ltd., Osaka (JP)

(72) Inventors: Ryuichi Natsui, Osaka (JP); Kensuke Nakura, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 232 days.

(21) Appl. No.: 15/813,212

(22) Filed: Nov. 15, 2017

(65) Prior Publication Data

US 2018/0090760 A1 Mar. 29, 2018

Related U.S. Application Data

(63) Continuation of application No. PCT/JP2016/003954, filed on Aug. 30, 2016.

(30) Foreign Application Priority Data

Sep. 16, 2015 (JP) ................................. 2015-182647

(51) Int. Cl.
| | |
|---|---|
| *H01M 4/1315* | (2010.01) |
| *H01M 4/505* | (2010.01) |
| *H01M 10/052* | (2010.01) |
| *C01G 51/00* | (2006.01) |
| *C01G 45/00* | (2006.01) |
| *H01M 4/36* | (2006.01) |
| *C01G 53/00* | (2006.01) |
| *H01M 4/485* | (2010.01) |
| *H01M 10/0525* | (2010.01) |
| *H01M 4/525* | (2010.01) |
| *H01M 4/62* | (2006.01) |
| *H01M 4/02* | (2006.01) |

(52) U.S. Cl.
CPC ........ *H01M 4/1315* (2013.01); *C01G 45/006* (2013.01); *C01G 51/006* (2013.01); *C01G 53/006* (2013.01); *H01M 4/362* (2013.01); *H01M 4/364* (2013.01); *H01M 4/485* (2013.01); *H01M 4/505* (2013.01); *H01M 4/525* (2013.01); *H01M 4/628* (2013.01); *H01M 10/052* (2013.01); *H01M 10/0525* (2013.01); *C01P 2002/76* (2013.01); *C01P 2006/40* (2013.01); *H01M 2004/028* (2013.01); *H01M 2220/30* (2013.01)

(58) Field of Classification Search
CPC .... H01M 4/1315; H01M 4/525; H01M 4/505; H01M 4/362; H01M 4/364; H01M 4/628; H01M 10/052; H01M 2004/028; H01M 4/485; H01M 10/0525; H01M 2220/30; C01G 51/006; C01G 45/006; C01G 53/006; C01P 2002/76; C01P 2006/40

See application file for complete search history.

(56) References Cited

U.S. PATENT DOCUMENTS

| | | | |
|---|---|---|---|
| 6,037,095 A | 3/2000 | Miyasaka | |
| 6,416,902 B1 | 7/2002 | Miyasaka | |
| 6,872,491 B2 | 3/2005 | Kanai et al. | |
| 7,429,434 B2 | 9/2008 | Mihara et al. | |
| 8,741,484 B2 | 6/2014 | Karthikeyan et al. | |
| 9,178,249 B2* | 11/2015 | Amine | H01M 10/052 |
| 2002/0022183 A1 | 2/2002 | Ogawa et al. | |
| 2002/0055042 A1 | 5/2002 | Kweon et al. | |
| 2004/0202938 A1 | 10/2004 | Noguchi et al. | |
| 2004/0229123 A1 | 11/2004 | Takahashi et al. | |
| 2005/0084757 A1 | 4/2005 | Kweon et al. | |
| 2009/0136854 A1 | 5/2009 | Nakura | |
| 2009/0202892 A1 | 8/2009 | Inagaki et al. | |
| 2010/0086854 A1 | 4/2010 | Kumar et al. | |
| 2011/0247321 A1 | 10/2011 | Streeter et al. | |
| 2011/0294019 A1 | 12/2011 | Amine et al. | |
| 2013/0136987 A1 | 5/2013 | Uehara et al. | |
| 2013/0209871 A1 | 8/2013 | Kato et al. | |
| 2013/0266868 A1 | 10/2013 | Sun et al. | |
| 2014/0099549 A1 | 4/2014 | Ceder et al. | |
| 2014/0127583 A1 | 5/2014 | Han et al. | |

(Continued)

FOREIGN PATENT DOCUMENTS

| | | |
|---|---|---|
| CN | 103928672 A | 7/2014 |
| EP | 2921455 | 9/2015 |

(Continued)

OTHER PUBLICATIONS

International Search Report of PCT application No. PCT/JP2016/003954 dated Dec. 6, 2016.

(Continued)

*Primary Examiner* — Laura Weiner

(74) *Attorney, Agent, or Firm* — McDermott Will & Emery LLP

(57) ABSTRACT

A positive-electrode active material contains a compound that has a crystal structure belonging to a space group FM3-M and contains is represented by the composition formula (1) and an insulating compound, $$Li_xMe_yO_\alpha F_\beta \qquad (1)$$

wherein Me denotes one or two or more elements selected from the group consisting of Mn, Co, Ni, Fe, Al, B, Ce, Si, Zr, Nb, Pr, Ti, W, Ge, Mo, Sn, Bi, Cu, Mg, Ca, Ba, Sr, Y, Zn, Ga, Er, La, Sm, Yb, V, and Cr, and the following conditions are satisfied.

$1.7 \leq x \leq 2.2$ $0.8 \leq y \leq 1.3$ $1 \leq \alpha \leq 2.5$ $0.5 \leq \beta \leq 2$

6 Claims, 2 Drawing Sheets

(56) References Cited

U.S. PATENT DOCUMENTS

| | | | |
|---|---|---|---|
| 2014/0162127 A1 | 6/2014 | Kim et al. | |
| 2014/0205913 A1 | 7/2014 | Park et al. | |
| 2014/0272607 A1 | 9/2014 | Amine et al. | |
| 2015/0010819 A1 | 1/2015 | Lee et al. | |
| 2015/0090924 A1 | 4/2015 | Lee et al. | |
| 2015/0093646 A1 | 4/2015 | Kawada | |
| 2015/0214550 A1 | 7/2015 | Song et al. | |
| 2015/0228970 A1* | 8/2015 | Song | H01M 4/366 429/220 |
| 2015/0380768 A1 | 12/2015 | Mizuno et al. | |
| 2016/0013517 A1 | 1/2016 | Nakazawa et al. | |
| 2016/0049640 A1 | 2/2016 | Takeuchi et al. | |
| 2016/0372747 A1 | 12/2016 | Rolff et al. | |
| 2017/0005332 A1 | 1/2017 | Chen et al. | |
| 2017/0207444 A1 | 7/2017 | Yanagihara et al. | |
| 2019/0088940 A1 | 3/2019 | Ceder et al. | |

FOREIGN PATENT DOCUMENTS

| | | |
|---|---|---|
| JP | H01-209663 A | 8/1989 |
| JP | 7-037617 | 2/1995 |
| JP | H09-330720 A | 12/1997 |
| JP | H10-294100 A | 11/1998 |
| JP | H10-302768 A | 11/1998 |
| JP | H10-326621 A | 12/1998 |
| JP | H11-339800 A | 12/1999 |
| JP | H11-345615 A | 12/1999 |
| JP | 2000-012031 A | 1/2000 |
| JP | 2000-260433 A | 9/2000 |
| JP | 2001-516492 A | 9/2001 |
| JP | 2002-015776 A | 1/2002 |
| JP | 2003-229130 A | 8/2003 |
| JP | 3578066 B2 | 10/2004 |
| JP | 2004-311408 A | 11/2004 |
| JP | 2004-349132 A | 12/2004 |
| JP | 2005-063953 A | 3/2005 |
| JP | 2006-261127 A | 9/2006 |
| JP | 2006-278341 A | 10/2006 |
| JP | 2007-018874 A | 1/2007 |
| JP | 2008-124038 A | 5/2008 |
| JP | 2009-187834 | 8/2009 |
| JP | 2011-018656 A | 1/2011 |
| JP | 2012-014851 A | 1/2012 |
| JP | 2012-038564 A | 2/2012 |
| JP | 2012-156046 A | 8/2012 |
| JP | 2013-222612 A | 10/2013 |
| JP | 2014-022191 A | 2/2014 |
| JP | 2014-116308 A | 6/2014 |
| JP | 2015-022958 A | 2/2015 |
| JP | 2015-069754 | 4/2015 |
| JP | 2015-111551 A | 6/2015 |
| JP | 2015-118892 A | 6/2015 |
| JP | 2015-128023 | 7/2015 |
| JP | 2015-159109 A | 9/2015 |
| JP | 2016-033902 A | 3/2016 |
| WO | 1997/044842 A1 | 11/1997 |
| WO | 2012/014846 A1 | 2/2012 |
| WO | 2012/086602 A1 | 6/2012 |
| WO | 2012/176267 A1 | 12/2012 |
| WO | 2014/126256 A1 | 8/2014 |
| WO | 2014/156153 A1 | 10/2014 |
| WO | 2014/157591 A1 | 10/2014 |

OTHER PUBLICATIONS

ICSD Details on Search Result for Li2 (Mn O3), printed on Feb. 4, 2020.
Coban, Hüseyin Can Çoban, "Metal Oxide (SnO2) Modified LiNi0. 8Co0.2O2 Cathode Material for Lithium ION Batteries," M.Sc. Thesis, Department of Nano Science and Nano Engineering, Nano Science and Nano Engineering Programme, Istanbul Technical University Graduate School of Science Engineering and Technology. May 2014.
The Extended European Search Report dated Jun. 1, 2018 for the related European Patent Application No. 16827416.5.
Ayuko Kitajou et al: "Electrochemical Performance of a Novel Cathode material "LiFeOF" for Li-ion Batteries", Electrochemistry, vol. 83, No. 10, Jan. 1, 2015 (Jan. 1, 2015), pp. 885-888, XP055416459.
International Search Report of PCT application No. PCT/JP2016/003215 dated Sep. 20, 2016.
International Search Report of PCT application No. PCT/JP2017/027997 dated Sep. 26, 2017.
International Search Report of PCT application No. PCT/JP2016/003949 dated Nov. 29, 2016.
International Search Report of PCT application No. PCT/JP2016/003955 dated Dec. 6, 2016.
International Search Report of PCT application No. PCT/JP2016/003948 dated Nov. 29, 2016.
International Search Report of PCT application No. PCT/JP2016/003952 dated Nov. 1, 2016.
International Search Report of PCT application No. PCT/JP2016/003953 dated Dec. 6, 2016.
International Search Report of PCT application No. PCT/JP2016/003951 dated Nov. 1, 2016.
International Search Report of PCT application No. PCT/JP2016/003950 dated Nov. 29, 2016.
International Search Report of PCT application No. PCT/JP2017/026210 dated Oct. 17, 2017.
M. Holzapfel et al., "Lithium-Ion Conductors of the System LiCo1-xFexO2, Preparation and Structural Investigation," Journal of Solid State Chemistry, 2001, 156, pp. 470-479.
S. Muhammad et al., "Deciphering the thermal behavior of lithium rich cathode material by in situ X-ray diffraction technique," Journal of Power Sources, 2015, 285, pp. 156-160.
International Search Report of PCT application No. PCT/JP2016/003956 dated Dec. 6, 2016.
Non-Final Office Action issued in U.S. Appl. No. 15/821,749, dated Jan. 16, 2020.
Notice of Allowance issued in U.S. Appl. No. 15/821,749, dated Apr. 15, 2020.
Non-Final Office Action issued in U.S. Appl. No. 15/821,745, dated Dec. 10, 2019.
Notice of Allowance issued in U.S. Appl. No. 15/821,745, dated Apr. 8, 2020.
Non-Final Office Action issued in U.S. Appl. No. 15/813,210, dated Jan. 2, 2020.
Non-Final Office Action issued in U.S. Appl. No. 15/813,204, dated Dec. 17, 2019.
Notice of Allowance issued in U.S. Appl. No. 15/813,204, dated Apr. 9, 2020.
Non-Final Office Action issued in U.S. Appl. No. 15/814,874, dated Jan. 2, 2020.
Non-Final Office Action issued in U.S. Appl. No. 15/811,685, dated Dec. 3, 2019.
Notice of Allowance issued in U.S. Appl. No. 15/811,685, dated Apr. 9, 2020.
Non-Final Office Action issued in U.S. Appl. No. 16/278,701, dated Aug. 27, 2019.
Non-Final Office Action issued in U.S. Appl. No. 16/278,701, dated Dec. 10, 2019.
Final Office Action issued in U.S. Appl. No. 16/278,701, dated Apr. 16, 2020.
Non-Final Office Action issued in U.S. Appl. No. 15/811,683, dated Nov. 15, 2018.
Final Office Action issued in U.S. Appl. No. 15/811,683, dated Apr. 18, 2019.
Notice of Allowance issued in U.S. Appl. No. 15/811,683, dated Aug. 19, 2019.
Non-Final Office Action issued in U.S. Appl. No. 15/811,684, dated Dec. 5, 2019.
Final Office Action issued in U.S. Appl. No. 15/811,684, dated Mar. 13, 2020.
Notice of Allowance issued in U.S. Appl. No. 15/811,684, dated Apr. 8, 2020.
Non-Final Office Action issued in U.S. Appl. No. 15/838,360, dated Feb. 10, 2020.

(56) References Cited

OTHER PUBLICATIONS

Non-Final Office Action issued in U.S. Appl. No. 15/844,626, dated Mar. 18, 2020.
Non-Final Office Action issued in U.S. Appl. No. 15/813,218, dated Jan. 16, 2020.
Non-Final Office Action issued in U.S. Appl. No. 15/702,632, dated Jun. 17, 2019.
Non-Final Office Action issued in U.S. Appl. No. 15/702,632, dated Nov. 26, 2019.
Final Office Action issued in U.S. Appl. No. 15/702,632, dated Aug. 23, 2019.
Non-Final Office Action issued in U.S. Appl. No. 15/838,360, dated Apr. 22, 2020.
Notice of Allowance issued in U.S. Appl. No. 15/702,632, dated Apr. 20, 2020.
Notice of Allowance issued in U.S. Appl. No. 15/813,210, dated Apr. 22, 2020.
Notice of Allowance issued in U.S. Appl. No. 15/813,218, dated May 4, 2020.
Notice of Allowance issued in U.S. Appl. No. 15/814,874, dated May 1, 2020.
Shuhua Ren et al., Improved Voltage and Cycling for Intercalation in High-Capacity Disordered Oxyfluoride Cathodes Advanced Science, Jun. 12, 2015, vol. 2, Issue 10, 1500128.
English Translation of Chinese Search Report dated Jul. 13, 2020 for the related Chinese Patent Application No. 201680013989.7.
Synthesis and electrochemistry of cubic rocksalt Li—Ni—Ti—O compounds in the phase diagram of LiNiO2—LiTiO2—Li[Li1/3Ti2/3]O2 Lianqi Zhang, et al Journal of power Sourses, 185(2008) p. 534-p. 541.
Written Opinion for Japanese Patent Application No. 2017-540475, dated Sep. 1, 2020; with English translation.

* cited by examiner

POSITIVE-ELECTRODE ACTIVE MATERIAL AND BATTERY

BACKGROUND

1. Technical Field

The present disclosure relates to a positive-electrode active material for use in batteries and to a battery.

2. Description of the Related Art

Japanese Unexamined Patent Application Publication No. 7-037617 discloses a positive-electrode active material that has a crystal structure belonging to the space group R3-M and is represented by the formula $Li_wM_xO_yX_z$ (M denotes Co, Ni, Mn, V, Fe, or Ti, X denotes at least one halogen element, $0.2 \leq w \leq 2.5$, $0.8 \leq x \leq 1.25$, $1 \leq y \leq 2$, $0 < z \leq 1$).

SUMMARY

In the related art, there is a demand for a battery with a high capacity retention rate.

In one general aspect, the techniques disclosed here feature a positive-electrode active material according to one aspect of the present disclosure contains a compound that has a crystal structure belonging to the space group FM3-M and that is represented by the composition formula (1) and an insulating compound.

$$Li_xMe_yO_\alpha F_\beta \qquad (1)$$

Me denotes one or two or more elements selected from the group consisting of Mn, Co, Ni, Fe, Al, B, Ce, Si, Zr, Nb, Pr, Ti, W, Ge, Mo, Sn, Bi, Cu, Mg, Ca, Ba, Sr, Y, Zn, Ga, Er, La, Sm, Yb, V, and Cr, and the following conditions are satisfied: $1.7 \leq x \leq 2.2$, $0.8 \leq y \leq 1.3$, $1 \leq \alpha \leq 2.5$, $0.5 \leq \beta \leq 2$.

The present disclosure can provide a battery with a high capacity retention rate.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
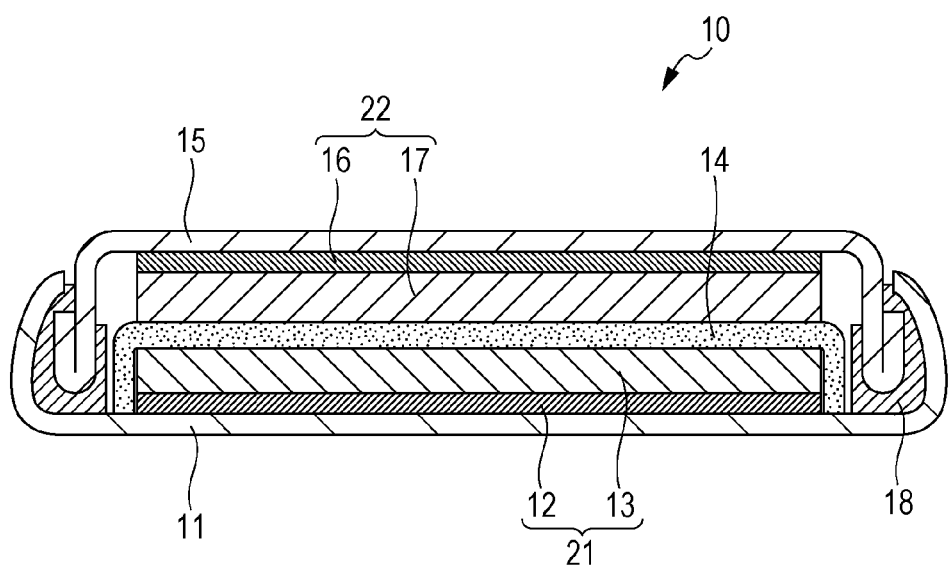
FIG. 1 is a schematic cross-sectional view of a battery of a second embodiment.

Embodiments of the present disclosure will be described below.

First Embodiment

A positive-electrode active material of a first embodiment contains a compound that has a crystal structure belonging to the space group FM3-M and that is represented by the composition formula (1) and an insulating compound,

 (1)

Me denotes at least one selected from the group consisting of Mn, Co, Ni, Fe, Al, B, Ce, Si, Zr, Nb, Pr, Ti, W, Ge, Mo, Sn, Bi, Cu, Mg, Ca, Ba, Sr, Y, Zn, Ga, Er, La, Sm, Yb, V, and Cr (that is, one or two or more elements selected from the group), and the following conditions are satisfied.

$1.7 \leq x \leq 2.2$ $0.8 \leq y \leq 1.3$ $1 \leq \alpha \leq 2.5$ $0.5 \leq \beta \leq 2$ Such an embodiment can provide a high-capacity battery with a high capacity retention rate.

For example, a lithium-ion battery containing a positive-electrode active material containing the compound has an oxidation-reduction potential (vs. Li/Li⁺) of approximately 3.3 V and a capacity retention rate of 57% or more after 5 cycles.

In the composition formula (1), x of less than 1.7 indicates that the amount of available Li in the compound decreases. This results in insufficient capacity.

In the composition formula (1), x of more than 2.2 (or y of less than 0.8) indicates decreased utilization of an oxidation-reduction reaction of an available transition metal in the compound. This results in increased utilization of an oxidation-reduction reaction of oxygen. This destabilizes the crystal structure and results in insufficient capacity.

In the composition formula (1), α of less than 1 (or β of more than 2) indicates that the effects of highly electronegative F on the compound increase. This results in decreased electron conductivity and insufficient capacity.

In the composition formula (1), α of more than 2.5 (or β of less than 0.5) indicates that the effects of highly electronegative F on the compound decrease. This decreases cation-anion interaction. This destabilizes the structure when Li is desorbed and therefore results in insufficient capacity.

In the positive-electrode active material of the first embodiment, a compound represented by the composition formula (1) has a crystal structure belonging to the space group FM3-M (rock-salt-type crystal structure).

In the composition formula (1), the ratio of Li to Me is represented by $\{Li_x/Me_y\}$.

In the ratio, $1.7 \leq x \leq 2.2$ and $0.8 \leq y \leq 1.3$.

Thus, the ratio of Li to Me is theoretically in the range of $1.31 \leq \{Li_x/Me_y\} \leq 2.75$ and is more than 1.

The number of Li atoms per Me atom is larger than that for a known positive-electrode active material, for example, $LiMnO_2$.

In a compound represented by the composition formula (1), Li and Me are probably located at the same site.

Thus, a compound represented by the composition formula (1) can intercalate and deintercalate more Li per Me atom than a known positive-electrode active material, for example, $LiMnO_2$.

Thus, the positive-electrode active material of the first embodiment is suitable for high-capacity lithium-ion batteries with a high capacity retention rate.

Upon abstraction of much Li, a layered structure specified by the space group R3-M cannot hold the layers and disintegrates.

By contrast, a rock-salt-type crystal structure specified by the space group FM3-M, such as a compound according to the present disclosure, can stably maintain the structure without disintegration, even after abstraction of much Li.

The use of the positive-electrode active material of the first embodiment may require a higher charge voltage than before. This causes a side reaction, such as decomposition, of the electrolyte. This results in the formation of a resistive layer and poor cycle characteristics.

Thus, the positive-electrode active material of the first embodiment contains an insulating compound. For example, the insulating compound is present on the surface of $Li_xMe_yO_\alpha F_\beta$. This suppresses the reaction with the electrolyte and the formation of the resistive layer. Thus, a high-capacity battery with good cycle characteristics can be provided.

If the positive-electrode active material of the first embodiment contains no insulating compound, a side reaction, such as decomposition, of the electrolyte occurs on the surface of $Li_xMe_yO_\alpha F_\beta$ in the charging process. This results in the formation of a resistive layer on the surface and may result in insufficient capacity.

In the positive-electrode active material of the first embodiment, when the amount of the insulating compound is larger than 5% by mass of the compound represented by the composition formula (1), the surface is electrochemically deactivated. This increases resistance and may result in insufficient capacity.

Thus, in the positive-electrode active material of the first embodiment, the amount of the insulating compound may be 5% or less by mass of the compound represented by the composition formula (1).

In such an embodiment, electrochemical deactivation of the surface of the positive-electrode active material can be prevented. This can suppress an increase in resistance. Consequently, a high-capacity battery with good cycle characteristics can be provided.

In the positive-electrode active material of the first embodiment, the amount of the insulating compound may range from 0.5% to 1% by mass of the compound represented by the composition formula (1).

Such an embodiment can provide a battery with a higher capacity retention rate.

An oxide, halide, sulfide, or phosphorus compound can be appropriately selected and used as the insulating compound. The insulating compound may be at least one selected from $H_3BO_3$, $AlF_3$, $Al_2O_3$, $Mn_2O_3$, $Fe_2O_3$, $CuO$, $NiO$, $CO_3O_4$, $Eu_2O_3$, $Sm_2O_3$, and $CeO_2$.

Such an embodiment can provide a battery with a higher capacity retention rate.

In the positive-electrode active material of the first embodiment, the insulating compound may cover at least part of the surface of the compound represented by the composition formula (1).

In the positive-electrode active material of the first embodiment, the insulating compound and at least part of the surface of the compound represented by the composition formula (1) may form a solid solution.

The positive-electrode active material of the first embodiment may contain the compound as a main component.

Such an embodiment can provide a higher-capacity battery with a high capacity retention rate.

In addition to the compound as a main component, the positive-electrode active material of the first embodiment may contain incidental impurities, or starting materials for the synthesis of the compound, by-products, and degradation products.

In the positive-electrode active material of the first embodiment, the compound may satisfy $x+y=\alpha+\beta=3$ in the composition formula (1).

Such an embodiment can provide a higher-capacity battery with a high capacity retention rate.

In the positive-electrode active material of the first embodiment, the compound may be $Li_2MnO_2F$ or $Li_2CoO_2F$.

Such an embodiment can provide a higher-capacity battery with a high capacity retention rate.

In $Li_xMe_yO_\alpha F_\beta$, Li may be partly substituted by an alkali metal, such as Na or K.

In the positive-electrode active material of the first embodiment, Me in the composition formula (1) may be one element selected from Mn, Co, Ni, and Fe, a solid solution composed of Ni, Co, and Mn, or a solid solution composed of Ni, Co, and Al.

Such an embodiment can provide a higher-capacity battery.

In the positive-electrode active material of the first embodiment, the compound may satisfy $1.79 \leq x+y \leq 2.18$ in the composition formula (1).

Such an embodiment can provide a higher-capacity battery.

In the positive-electrode active material of the first embodiment, the compound may satisfy $1.89 \leq x+y \leq 2$ in the composition formula (1).

Such an embodiment can provide a higher-capacity battery.

In the positive-electrode active material of the first embodiment, the compound may satisfy $0.79 \leq \beta \leq 1$ in the composition formula (1).

Such an embodiment can provide a higher-capacity battery.

<Method for Producing Compound>

An exemplary method for producing the compound of the positive-electrode active material of the first embodiment will be described below.

A compound represented by the composition formula (1) can be produced by the method described below, for example.

A raw material containing Li, a raw material containing F, and a raw material containing Me are prepared. Examples of the raw material containing Li include oxides, such as $Li_2O$ and $Li_2O_2$, salts, such as LiF, $Li_2CO_3$, and LiOH, and lithium composite transition metal oxides, such as $LiMeO_2$ and $LiMe_2O_4$. Examples of the raw material containing F include LiF and transition metal fluorides. Examples of the raw material containing Me include oxides with various oxidation states, such as $Me_2O_3$, salts, such as $MeCO_3$ and $MeNO_3$, hydroxides, such as $Me(OH)_2$ and MeOOH, and lithium composite transition metal oxides, such as $LiMeO_2$ and $LiMe_2O_4$. In the case that Me is Mn, examples of the raw material containing Mn include manganese oxides with various oxidation states, such as $Mn_2O_3$, salts, such as $MnCO_3$ and $MnNO_3$, hydroxides, such as $Mn(OH)_2$ and MnOOH, and lithium composite transition metal oxides, such as $LiMnO_2$ and $LiMn_2O_4$.

These raw materials are weighed at the mole ratio of the composition formula (1).

The variables "x, y, $\alpha$, and $\beta$" in the composition formula (1) can be altered in the ranges described for the composition formula (1).

The weighed raw materials are mixed, for example, by a dry process or a wet process and are allowed to react mechanochemically for 10 hours or more to produce a compound represented by the composition formula (1). For example, a mixing apparatus, such as a ball mill, may be used.

The raw materials and the conditions for mixing a mixture of the raw materials can be adjusted to produce a compound substantially represented by the composition formula (1).

The use of a lithium transition metal composite oxide as a precursor can decrease the energy for mixing elements. Thus, a compound represented by the composition formula (1) can be produced with higher purity.

The composition of a compound represented by the composition formula (1) thus produced can be determined by ICP spectroscopy and an inert gas fusion-infrared absorption method, for example.

A compound represented by the composition formula (1) can be identified by determining the space group of the crystal structure by powder X-ray analysis.

Thus, a method for producing a positive-electrode active material according to one aspect of the first embodiment includes (a) a step of preparing the raw materials and (b) a step of mechanochemically reacting the raw materials to produce the positive-electrode active material.

The step (a) may include a step of mixing a raw material containing Li and F and a raw material containing Me at a Li/Me mole ratio in the range of 1.31 to 2.33 to prepare a raw material mixture.

The step (a) may include a step of producing a raw material, a lithium transition metal composite oxide, by a known method.

The step (a) may include a step of mixing the raw materials at a Li/Me mole ratio in the range of 1.7 to 2.0 to prepare a raw material mixture.

The step (b) may include a step of mechanochemically reacting the raw materials in a ball mill.

Thus, a compound represented by the composition formula (1) may be synthesized by mechanochemically reacting a precursor (for example, LiF, $Li_2O$, a transition metal oxide, a lithium composite transition metal, etc.) in a planetary ball mill.

The mixing ratio of the precursor can be adjusted to introduce more Li atoms.

When the precursor is reacted by a solid phase method, the precursor is decomposed into more stable compounds.

Thus, a compound that has a crystal structure belonging to the space group FM3-M and is represented by the composition formula (1) cannot be produced by a method for reacting the precursor by a solid phase method.

Surface treatment of $Li_xMe_yO_\alpha F_\beta$ with the insulating compound may be made by any method. For example, a sol-gel method or a planetary ball mill may be used.

Second Embodiment

A second embodiment will be described below. The contents described in the first embodiment are appropriately omitted to avoid overlap.

A battery of the second embodiment includes a positive electrode containing the positive-electrode active material of the first embodiment, a negative electrode, and an electrolyte.

Such an embodiment can provide a high-capacity battery with a high capacity retention rate.

More specifically, as described in the first embodiment, the positive-electrode active material contains many Li atoms per Me atom. Thus, a high-capacity battery can be provided.

As described in the first embodiment, the positive-electrode active material contains the insulating compound. Thus, a battery with a high capacity retention rate can be provided.

The battery of the second embodiment may be a lithium-ion secondary battery or a non-aqueous electrolyte secondary battery, for example.

In the battery of the second embodiment, for example, the negative electrode may contain a negative-electrode active material that can adsorb and desorb lithium (that has lithium adsorption and desorption characteristics).

In the battery of the second embodiment, for example, the electrolyte may be a non-aqueous electrolyte (for example, a non-aqueous electrolyte solution).

FIG. 1 is a schematic cross-sectional view of a battery 10 of the second embodiment.

As illustrated in FIG. 1, the battery 10 includes a positive electrode 21, a negative electrode 22, a separator 14, a case 11, a sealing plate 15, and a gasket 18.

The separator 14 is disposed between the positive electrode 21 and the negative electrode 22.

The positive electrode 21, the negative electrode 22, and the separator 14 are impregnated with a non-aqueous electrolyte (for example, a non-aqueous electrolyte solution).

The positive electrode 21, the negative electrode 22, and the separator 14 constitute an electrode group.

The electrode group is housed in the case 11.

The case 11 is sealed with the gasket 18 and the sealing plate 15.

The positive electrode 21 includes a positive-electrode current collector 12 and a positive-electrode active material layer 13 disposed on the positive-electrode current collector 12.

The positive-electrode current collector 12 is formed of a metallic material (aluminum, stainless steel, aluminum alloy, etc.), for example.

The positive-electrode current collector 12 may be omitted, and the case 11 may be used as a positive-electrode current collector.

The positive-electrode active material layer 13 contains the positive-electrode active material of the first embodiment.

If necessary, the positive-electrode active material layer 13 may contain an additive agent (electrically conductive agent, ionic conduction aid, binder, etc.).

The negative electrode 22 includes a negative-electrode current collector 16 and a negative-electrode active material layer 17 disposed on the negative-electrode current collector 16.

The negative-electrode current collector 16 is formed of a metallic material (copper, nickel, aluminum, stainless steel, aluminum alloy, etc.), for example.

The negative-electrode current collector 16 may be omitted, and the sealing plate 15 may be used as a negative-electrode current collector.

The negative-electrode active material layer 17 contains a negative-electrode active material.

If necessary, the negative-electrode active material layer 17 may contain an additive agent (electrically conductive agent, ionic conduction aid, binder, etc.).

The negative-electrode active material may be a metallic material, carbon material, oxide, nitride, tin compound, or silicon compound.

The metallic material may be a single metal or an alloy. Examples of the metallic material include lithium metals and lithium alloys.

Examples of the carbon material include natural graphite, coke, carbon under graphitization, carbon fiber, spherical carbon, artificial graphite, and amorphous carbon.

From the perspective of capacity density, silicon (Si), tin (Sn), silicon compounds, and tin compounds can be suitably used. Silicon compounds and tin compounds may be alloys and solid solutions.

Examples of the silicon compounds include $SiO_x$ (wherein $0.05<x<1.95$). Compounds (alloys and solid solutions) produced by substituting another element for part of silicon of $SiO_x$ may also be used. The other element may be at least one selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin.

Examples of the tin compound include $Ni_2Sn_4$, $Mg_2Sn$, $SnO_x$ (wherein $0<x<2$), $SnO_2$, and $SnSiO_3$. One tin compound selected from these compounds may be used alone. Alternatively, two or more tin compounds selected from these compounds may be used in combination.

The negative-electrode active material may have any shape. The negative-electrode active material may have a known shape (particulate, fibrous, etc.).

The negative-electrode active material layer 17 may be filled with (adsorb) lithium by any method. More specifically, the method may be (a) a method for depositing lithium on the negative-electrode active material layer 17 by a gas phase method, such as a vacuum evaporation method, or (b) a method for heating a lithium metal foil in contact with the negative-electrode active material layer 17. In these methods, lithium can be diffused into the negative-electrode active material layer 17 by heat. Alternatively, lithium may be electrochemically adsorbed on the negative-electrode active material layer 17. More specifically, a battery is assembled from the negative electrode 22 free of lithium and a lithium metal foil (positive electrode). Subsequently, the battery is charged to adsorb lithium on the negative electrode 22.

Examples of the binder for the positive electrode 21 and the negative electrode 22 include poly(vinylidene difluoride), polytetrafluoroethylene, polyethylene, polypropylene, aramid resin, polyamide, polyimide, polyamideimide, polyacrylonitrile, poly(acrylic acid), poly(methyl acrylate), poly(ethyl acrylate), poly(hexyl acrylate), poly(methacrylic acid), poly(methyl methacrylate), poly(ethyl methacrylate), poly(hexyl methacrylate), poly(vinyl acetate), polyvinylpyrrolidone, polyether, polyethersulfone, hexafluoropolypropylene, styrene-butadiene rubber, and carboxymethylcellulose. Other examples of the binder include copolymers of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. The binder may also be a mixture of two or more materials selected from these materials.

Examples of the electrically conductive agent for the positive electrode 21 and the negative electrode 22 include graphite, carbon black, electrically conductive fiber, graphite fluoride, metal powders, electrically conductive whiskers, electrically conductive metal oxides, and electrically conductive organic materials. Examples of the graphite include natural graphite and artificial graphite. Examples of the carbon black include acetylene black, ketjen black (registered trademark), channel black, furnace black, lampblack, and thermal black. Examples of the metal powders include aluminum powders. Examples of the electrically conductive whiskers include zinc oxide whiskers and potassium titanate whiskers. Examples of the electrically conductive metal oxides include titanium oxide. Examples of the electrically conductive organic materials include phenylene derivatives.

The separator 14 may be formed of a material that has high ion permeability and sufficient mechanical strength. Examples of such a material include microporous thin films, woven fabrics, and nonwoven fabrics. More specifically, it is desirable that the separator 14 be formed of a polyolefin, such as polypropylene or polyethylene. The separator 14 formed of a polyolefin has not only good durability but also a shutdown function in case of excessive heating. The separator 14 has a thickness in the range of 10 to 300 μm (or 10 to 40 μm), for example. The separator 14 may be a monolayer film formed of one material. Alternatively, the separator 14 may be a composite film (or multilayer film) formed of two or more materials. The separator 14 has a porosity in the range of 30% to 70% (or 35% to 60%), for example. The term "porosity", as used herein, refers to the volume ratio of pores to the separator 14. The "porosity" is measured by a mercury intrusion method, for example.

The non-aqueous electrolyte solution contains a non-aqueous solvent and a lithium salt dissolved in the non-aqueous solvent.

Examples of the non-aqueous solvent include cyclic carbonate solvents, chain carbonate solvents, cyclic ether solvents, chain ether solvents, cyclic ester solvents, chain ester solvents, and fluorinated solvents.

Examples of the cyclic carbonate solvents include ethylene carbonate, propylene carbonate, and butylene carbonate.

Examples of the chain carbonate solvents include dimethyl carbonate, ethyl methyl carbonate, and diethyl carbonate.

Examples of the cyclic ether solvents include tetrahydrofuran, 1,4-dioxane, and 1,3-dioxolane.

Examples of the chain ether solvents include 1,2-dimethoxyethane and 1,2-diethoxyethane.

Examples of the cyclic ester solvent include γ-butyrolactone.

Examples of the chain ester solvents include methyl acetate.

Examples of the fluorinated solvents include fluoroethylene carbonate, methyl fluoropropionate, fluorobenzene, fluoroethyl methyl carbonate, fluorodimethylene carbonate, and fluoronitriles.

The non-aqueous solvent may be one non-aqueous solvent selected from these. Alternatively, the non-aqueous solvent may be a combination of two or more non-aqueous solvents selected from these.

The non-aqueous electrolyte solution may contain at least one fluorinated solvent selected from the group consisting of fluoroethylene carbonate, methyl fluoropropionate, fluorobenzene, fluoroethyl methyl carbonate, and fluorodimethylene carbonate.

These fluorinated solvents in the non-aqueous electrolyte solution improve the oxidation resistance of the non-aqueous electrolyte solution.

Consequently, even when the battery 10 is charged at a high voltage, the battery 10 can operate stably.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. The lithium salt may be one lithium salt selected from these. Alternatively, the lithium salt may be a mixture of two or more lithium salts selected from these. The concentration of the lithium salt ranges from 0.5 to 2 mol/liter, for example.

The battery of the second embodiment may be of various types, such as coin type, cylindrical type, square or rectangular type, sheet type, button type, flat type, or layered type.

EXAMPLES

Example 1

[Production of Positive-Electrode Active Material]

LiF, $Li_2O$, and $Mn_2O_3$ were weighed at a mole ratio of $LiF/Li_2O/Mn_2O_3=1.0/0.5/0.5$.

The raw materials, together with a proper amount of φ3-mm zirconia balls, were put in a 45-cc zirconia container, which was then sealed in an argon glove box.

It was removed from the argon glove box and was treated in a planetary ball mill at 600 rpm for 30 hours.

The resulting compound was subjected to X-ray powder diffraction measurement.

Figure 2:
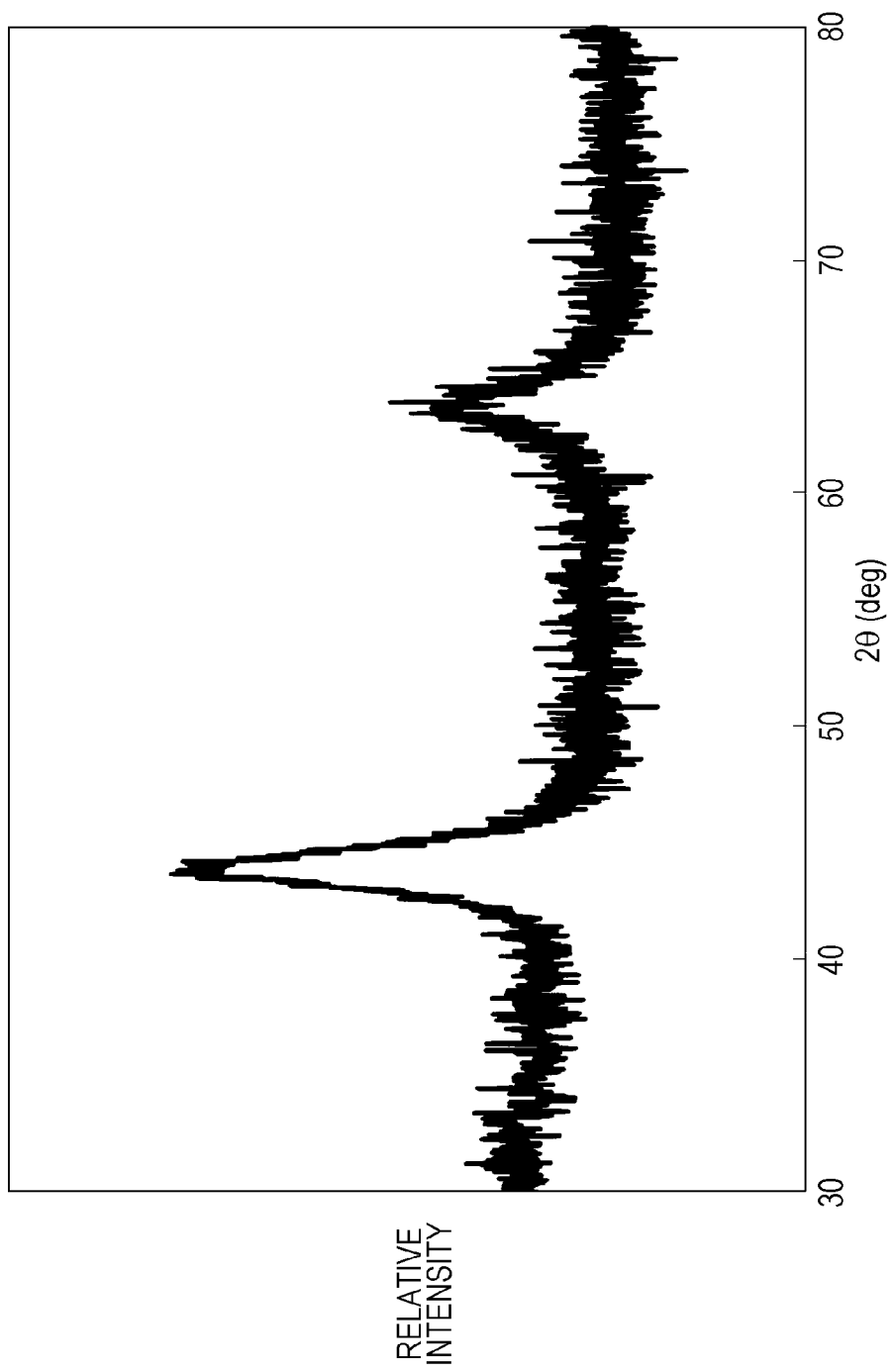
FIG. 2 is an X-ray powder diffraction chart of a positive-electrode active material of Example 1.

FIG. 2 shows the results.

The space group of the compound was FM3-M.

The composition of the compound was determined by ICP spectroscopy and inert gas fusion-infrared absorption.

The composition of the compound was $Li_2MnO_2F$.

1 g of the compound was put in aqueous boric acid, which was produced by dissolving 0.01 g of boric acid ($H_3BO_3$) in 10 g of water, was stirred, and was dried to prepare a positive-electrode active material.

Observation of the positive-electrode active material with a scanning electron microscope and a transmission electron microscope showed that the surface of $Li_2MnO_2F$ was partly covered with boric acid.

[Production of Battery]

70 parts by mass of the compound, 20 parts by mass of an electrically conductive agent, 10 parts by mass of poly (vinylidene difluoride) (PVDF), and a proper amount of 2-methylpyrrolidone (NMP) were mixed to prepare a positive-electrode mixture slurry.

The positive-electrode mixture slurry was applied to one side of a positive-electrode current collector formed of aluminum foil 20 μm in thickness.

The positive-electrode mixture slurry was dried and rolled to form a positive-electrode plate with a positive-electrode active material layer. The positive-electrode plate had a thickness of 60 μm.

A circular positive electrode 12.5 mm in diameter was punched out from the positive-electrode plate.

A circular negative electrode 14.0 mm in diameter was punched out from lithium metal foil 300 μm in thickness.

Fluoroethylene carbonate (FEC), ethylene carbonate (EC), and ethyl methyl carbonate (EMC) were mixed at a volume ratio of 1:1:6 to prepare a non-aqueous solvent.

$LiPF_6$ was dissolved at a concentration of 1.0 mol/liter in the non-aqueous solvent to prepare a non-aqueous electrolyte solution.

A separator (manufactured by Celgard, LLC., product number 2320, 25 μm in thickness) was impregnated with the non-aqueous electrolyte solution.

Celgard (registered trademark) 2320 is a 3-layer separator composed of a polypropylene layer, a polyethylene layer, and a polypropylene layer.

A CR2032 coin-type battery was assembled from the positive electrode, the negative electrode, and the separator in a dry box maintained at a dew point of −50° C.

Examples 2 to 4

The amount of boric acid ($H_3BO_3$) added was changed from Example 1.

Table lists the amount of boric acid ($H_3BO_3$) added in Examples 2 to 4.

Except for these, the positive-electrode active materials of Examples 2 to 4 were synthesized in the same manner as in Example 1.

Coin-type batteries were produced in the same manner as in Example 1 by using the positive-electrode active materials of Examples 2 to 4.

Example 5

$Li_2MnO_2F$ was synthesized in the same manner as in Example 1.

Boric acid ($H_3BO_3$) was weighed to 1% by mass of the amount of $Li_2MnO_2F$ used. $Li_2MnO_2F$ and boric acid, together with a proper amount of φ3-mm zirconia balls, were put in a 45-cc zirconia container, which was then sealed in an argon glove box.

It was removed from the argon glove box and was treated in a planetary ball mill at 600 rpm for 5 hours.

Observation of the positive-electrode active material with a scanning electron microscope and a transmission electron microscope showed a solid solution of boric acid on part of the surface of $Li_2MnO_2F$.

Examples 6 to 15

The insulating compound was changed from Example 5.

Table lists the insulating compound and the amount thereof in Examples 6 to 15.

Except for these, coin-type batteries were produced in the same manner as in Example 1 by using the positive-electrode active materials of Examples 6 to 15.

Example 16

Lithium cobalt oxide ($LiCoO_2$) was produced by a known method.

The space group of the lithium cobalt oxide was R3-M.

LiF and $LiCoO_2$ were weighed at a mole ratio of $LiF/LiCoO_2=1.0/1.0$.

The raw materials, together with a proper amount of φ3-mm zirconia balls, were put in a 45-cc zirconia container, which was then sealed in an argon glove box.

It was removed from the argon glove box and was treated in a planetary ball mill at 600 rpm for 30 hours.

The resulting compound was subjected to X-ray powder diffraction measurement.

The space group of the compound was FM3-M.

The composition of the compound was determined by ICP spectroscopy and inert gas fusion-infrared absorption.

The composition of the compound was $Li_2CoO_2F$.

The compound and 1 part by mass of boric acid ($H_3BO_3$), together with a proper amount of φ3-mm zirconia balls, were put in a 45-cc zirconia container, which was then sealed in an argon glove box.

It was removed from the argon glove box and was treated in a planetary ball mill at 600 rpm for 5 hours.

Observation of the positive-electrode active material with a scanning electron microscope and a transmission electron microscope showed a solid solution of boric acid on part of the surface of $Li_2CoO_2F$.

A coin-type battery was produced in the same manner as in Example 1 by using the positive-electrode active material of Example 16.

Comparative Example 1

LiF, Li$_2$O, and Mn$_2$O$_3$ were weighed at a mole ratio of LiF/Li$_2$O/Mn$_2$O$_3$=1.0/0.5/0.5.

The raw materials, together with a proper amount of φ3-mm zirconia balls, were put in a 45-cc zirconia container, which was then sealed in an argon glove box.

It was removed from the argon glove box and was treated in a planetary ball mill at 600 rpm for 30 hours.

The resulting compound was subjected to X-ray powder diffraction measurement.

The space group of the compound was FM3-M.

The composition of the compound was determined by ICP spectroscopy and inert gas fusion-infrared absorption.

The composition of the compound was Li$_2$MnO$_2$F.

A coin-type battery was produced in the same manner as in Example 1 by using the positive-electrode active material of Comparative Example 1.

Comparative Example 2

Lithium cobalt oxide (LiCoO$_2$) was produced by a known method.

The space group of the lithium cobalt oxide was R3-M.

LiF and LiCoO$_2$ were weighed at a mole ratio of LiF/LiCoO$_2$=1.0/1.0.

The raw materials, together with a proper amount of φ3-mm zirconia balls, were put in a 45-cc zirconia container, which was then sealed in an argon glove box.

It was removed from the argon glove box and was treated in a planetary ball mill at 600 rpm for 30 hours.

The resulting compound was subjected to X-ray powder diffraction measurement.

The space group of the compound was FM3-M.

The composition of the compound was determined by ICP spectroscopy and inert gas fusion-infrared absorption.

The composition of the compound was Li$_2$CO$_2$F.

A coin-type battery was produced in the same manner as in Example 1 by using the positive-electrode active material of Comparative Example 2.

<Evaluation of Battery>

The electric current density on the positive electrode was set at 1.0 mA/cm$^2$, and the battery of Example 1 was charged to a voltage of 5.2 V.

Subsequently, the discharge cut-off voltage was set at 1.5 V, and the battery of Example 1 was discharged at an electric current density of 1.0 mA/cm$^2$.

Charging and discharging was repeated 5 times. The capacity retention rate after 5 cycles of charging and discharging (hereinafter referred to as the capacity retention rate after 5 cycles) was measured.

The capacity retention rate after 5 cycles in the battery of Example 1 was 73%.

The capacity retention rate after 5 cycles in the coin-type battery of Comparative Example 1 was measured in the same manner as in Example 1.

The capacity retention rate after 5 cycles in the battery of Comparative Example 1 was 53%.

The capacities of the coin-type batteries of Examples 2 to 16 and Comparative Example 2 were measured in the same manner as in Example 1.

Table shows the results.

TABLE

| Sample | Composition of main component | Insulating compound | Addition amount (parts by mass) | Capacity retention rate after 5 cycles (%) |
|---|---|---|---|---|
| Example 1 | Li$_2$MnO$_2$F | H$_3$BO$_3$ | 1 | 73 |
| Example 2 | Li$_2$MnO$_2$F | H$_3$BO$_3$ | 0.1 | 60 |
| Example 3 | Li$_2$MnO$_2$F | H$_3$BO$_3$ | 0.5 | 68 |
| Example 4 | Li$_2$MnO$_2$F | H$_3$BO$_3$ | 5 | 62 |
| Example 5 | Li$_2$MnO$_2$F | H$_3$BO$_3$ | 1 | 73 |
| Example 6 | Li$_2$MnO$_2$F | AlF$_3$ | 1 | 72 |
| Example 7 | Li$_2$MnO$_2$F | Al$_2$O$_3$ | 1 | 70 |
| Example 8 | Li$_2$MnO$_2$F | Mn$_2$O$_3$ | 1 | 61 |
| Example 9 | Li$_2$MnO$_2$F | Fe$_2$O$_3$ | 1 | 59 |
| Example 10 | Li$_2$MnO$_2$F | CuO | 1 | 57 |
| Example 11 | Li$_2$MnO$_2$F | NiO | 1 | 59 |
| Example 12 | Li$_2$MnO$_2$F | Co$_3$O$_4$ | 1 | 69 |
| Example 13 | Li$_2$MnO$_2$F | Eu$_2$O$_3$ | 1 | 67 |
| Example 14 | Li$_2$MnO$_2$F | Sm$_2$O$_3$ | 1 | 63 |
| Example 15 | Li$_2$MnO$_2$F | CeO$_2$ | 1 | 66 |
| Example 16 | Li$_2$CoO$_2$F | H$_3$BO$_3$ | 1 | 64 |
| Comparative example 1 | Li$_2$MnO$_2$F | — | — | 53 |
| Comparative example 2 | Li$_2$CoO$_2$F | — | — | 45 |

Table shows that the capacity retention rates after 5 cycles in the batteries of Examples 1 to 15 ranged from 57% to 73%.

The capacity retention rates after 5 cycles in the batteries of Examples 1 to 15 are higher than that of Comparative Example 1.

The plausible reason for the higher cycle retention rates of Examples 1 to 15 is that the insulating compound on the surface of Li$_2$MnO$_2$F suppresses a side reaction with the electrolyte on the surface and the formation of a resistive layer.

Table also shows that the capacity retention rates after 5 cycles in the batteries of Examples 2 and 3 are lower than that of Example 1.

The plausible reason for the lower capacity retention rates after 5 cycles in Examples 2 and 3 is that a smaller amount of the insulating compound on the surface of Li$_2$MnO$_2$F resulted in a smaller effect of inhibiting a side reaction with the electrolyte on the surface.

Table also shows that the capacity retention rate after 5 cycles in the battery of Example 4 is lower than that of Example 1.

The plausible reason for the lower cycle retention rate of Example 4 is that a larger amount of the insulating compound on the surface of Li$_2$MnO$_2$F resulted in higher resistance on the surface and lower charge-discharge efficiency.

Table also shows that the capacity retention rate after 5 cycles in the battery of Example 5 is the same as the capacity retention rate after 5 cycles in the battery of Example 1.

The plausible reason for this is that the presence of the insulating compound, whether in the form of coating or solid solution, has an effect of inhibiting a side reaction of the electrolyte on the surface.

Table also shows that the capacity retention rates after 5 cycles in the batteries of Examples 6 to 15 are lower than that of Example 1.

The plausible reason for this is that the effect of inhibiting a side reaction with the electrolyte on the surface depends on the type of the insulating compound.

Table also shows that the capacity retention rate after 5 cycles in the battery of Example 16 is higher than that of Comparative Example 2.

The plausible reason for this is that the effect of inhibiting a side reaction with the electrolyte on the surface is independent of the composition of the mother structure.

Thus, whether Me denotes the element or the solid solution containing the element as described above, the presence of the insulating compound can increase the capacity retention rate.

When the amount of the insulating compound added is less than 0.5 parts by mass in Table (for example, 0.1 parts by mass in Example 2), the effect of inhibiting a side reaction with the electrolyte on the surface is small. Thus, the capacity retention rate after 5 cycles decreased.

When the amount of the insulating compound added is more than 1 part by mass in Table (for example, 5 parts by mass in Example 4), the surface resistance increased, the charge-discharge efficiency decreased, and the cycle retention rate decreased.

The results show that the addition of 0.5 to 1 part by mass of the insulating compound can increase the capacity retention rate.

A positive-electrode active material according to the present disclosure can be suitable for a positive-electrode active material of batteries, such as secondary batteries.

What is claimed is:

1. A positive-electrode active material comprising: a compound that has a crystal structure belonging to a space group FM-3M and is represented by the composition formula (1):

$$Li_xMe_yO_\alpha F_\beta \quad (1)$$

wherein Me denotes one or two or more elements selected from the group consisting of Mn, Co, Ni, Fe, Al, B, Ce, Si, Zr, Nb, Pr, Ti, W, Ge, Mo, Sn, Ca, Ba, Sr, Y, Zn, Ga, Er, La, Sm, Yb, Bi, Cu, Mg, V, and Cr, and the following conditions are satisfied $1.7 \leq x \leq 2$, $0.8 \leq y \leq 1.3$, $1 \leq \alpha \leq 2.5$, $0.5 \leq \beta \leq 2$, and $x+y=\alpha+\beta=3$; and an insulating compound, wherein the insulating compound is at least one selected from the group consisting of $H_3BO_3$, $AlF_3$, $Al_2O_3$, $Mn_2O_3$, $Fe_2O_3$, CuO, NiO, $Co_3O_4$, $Eu_2O_3$, $Sm_2O_3$, and $CeO_2$, and wherein an amount of the insulating compound ranges from 0.5% to 5% by mass of the compound.

2. The positive-electrode active material according to claim 1, wherein an amount of the insulating compound ranges from 0.5% to 1% by mass of the compound.

3. The positive-electrode active material according to claim 1, wherein the insulating compound covers at least part of a surface of the compound.

4. The positive-electrode active material according to claim 1, wherein the insulating compound and at least part of the surface of the compound form a solid solution.

5. A battery comprising:
a positive electrode containing the positive-electrode active material according to claim 1;
a negative electrode; and
an electrolyte.

6. A battery according to claim 5, wherein
the negative electrode contains a negative-electrode active material with lithium adsorption and desorption characteristics, and
the electrolyte is a non-aqueous electrolyte solution.

* * * * *